United States Patent
Youlio et al.

(10) Patent No.: US 9,863,583 B2
(45) Date of Patent: Jan. 9, 2018

(54) METHOD OF OPERATING A HYDROGEN DISPENSING UNIT

(71) Applicant: AIR PRODUCTS AND CHEMICALS, INC., Allentown, PA (US)

(72) Inventors: Andrew Marc Youlio, Simi Valley, CA (US); Joseph Perry Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 299 days.

(21) Appl. No.: 14/952,131

(22) Filed: Nov. 25, 2015

(65) Prior Publication Data

US 2017/0146194 A1 May 25, 2017

Related U.S. Application Data

(60) Provisional application No. 62/245,007, filed on Oct. 22, 2015, provisional application No. 62/221,425, filed on Sep. 21, 2015.

(51) Int. Cl.
*B65B 1/04* (2006.01)
*F17C 13/04* (2006.01)
(Continued)

(52) U.S. Cl.
CPC .............. *F17C 13/04* (2013.01); *F17C 5/007* (2013.01); *F17C 5/06* (2013.01); *F17C 13/025* (2013.01);
(Continued)

(58) Field of Classification Search
CPC .. F17C 13/04; F17C 5/007; F17C 5/06; F17C 13/025; F17C 2227/042; F17C 2270/0139; F17C 2250/0626; F17C 2250/032; F17C 2205/0326; F17C 2227/0355; F17C 2225/036; F17C 2225/0123; F17C 2223/036; F17C 2223/0123; F17C 2205/0388; F17C 2227/0337; F17C 2270/0173; F17C 2265/065; F17C 2260/021; F17C 2250/043; F17C 2221/012; F17C 2205/0332; F17C 2270/0168; F17C 2270/0176; F17C 2270/0189;
(Continued)

(56) References Cited

U.S. PATENT DOCUMENTS 5,238,030 A   8/1993   Miller et al.
8,016,570 B2  9/2011   Chan et al.
(Continued)

FOREIGN PATENT DOCUMENTS

JP   2007092928 A2   4/2007
JP   2010266023 A2   11/2010
(Continued)

*Primary Examiner* — Jason K Niesz
(74) *Attorney, Agent, or Firm* — Bryan C. Hoke, Jr.

(57) ABSTRACT

Method of operating a hydrogen dispensing where pressure relief is provided through block and bleed valves. After dispensing hydrogen from a dispensing station where the hydrogen is cooled during dispensing, trapped hydrogen remains in the transfer lines. During the idle time between refueling vehicles, the temperature of the trapped hydrogen increases resulting in an increase in the pressure of the trapped hydrogen. Block and bleed valves operate to relieve the pressure in the transfer lines.

16 Claims, 1 Drawing Sheet

(51) Int. Cl.
*F17C 5/06* (2006.01)
*F17C 13/02* (2006.01)
*F17C 5/00* (2006.01)

(52) U.S. Cl.
CPC ............ *F17C 2205/0326* (2013.01); *F17C 2205/0332* (2013.01); *F17C 2205/0388* (2013.01); *F17C 2221/012* (2013.01); *F17C 2223/0123* (2013.01); *F17C 2223/036* (2013.01); *F17C 2225/0123* (2013.01); *F17C 2225/035* (2013.01); *F17C 2225/036* (2013.01); *F17C 2227/0337* (2013.01); *F17C 2227/0355* (2013.01); *F17C 2227/042* (2013.01); *F17C 2250/032* (2013.01); *F17C 2250/043* (2013.01); *F17C 2250/0626* (2013.01); *F17C 2250/072* (2013.01); *F17C 2260/021* (2013.01); *F17C 2265/065* (2013.01); *F17C 2270/0139* (2013.01); *F17C 2270/0168* (2013.01); *F17C 2270/0171* (2013.01); *F17C 2270/0173* (2013.01); *F17C 2270/0176* (2013.01); *F17C 2270/0178* (2013.01); *F17C 2270/0189* (2013.01)

(58) Field of Classification Search
CPC ........ F17C 2270/0171; F17C 2225/035; F17C 2270/0178
See application file for complete search history.

(56) References Cited

U.S. PATENT DOCUMENTS

| | | |
|---|---|---|
| 2004/0016373 A1 | 8/2004 | Eichelberger et al. |
| 2005/0056661 A1 | 3/2005 | Casamatta et al. |
| 2006/0174965 A1 | 8/2006 | Hobbs |
| 2008/0185068 A1 | 8/2008 | Cohen et al. |
| 2012/0204975 A1 | 8/2012 | Chen |
| 2014/0007975 A1 | 1/2014 | Cohen et al. |

FOREIGN PATENT DOCUMENTS

| | | |
|---|---|---|
| JP | 2013231457 A | 11/2013 |
| JP | 2014055600 A2 | 3/2014 |
| JP | 2015102229 A2 | 6/2015 |
| WO | 20110060276 A2 | 5/2011 |
| WO | 20140084243 A1 | 6/2014 |

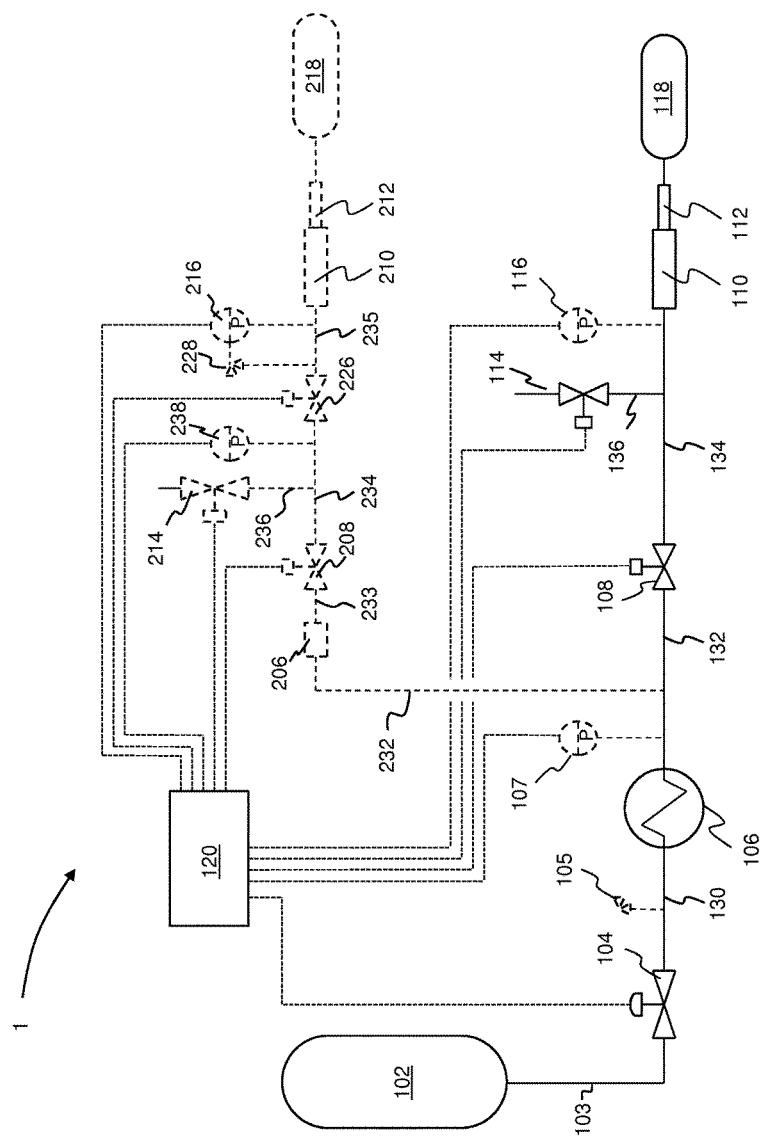

METHOD OF OPERATING A HYDROGEN DISPENSING UNIT

CROSS-REFERENCE TO RELATED APPLICATIONS

This application claims priority to provisional application U.S. Ser. No. 62/221,425, titled "Method of Operating a Hydrogen Dispensing Unit," filed Sep. 21, 2015, and provisional application U.S. Ser. No. 62/245,007, titled "Method of Operating a Hydrogen Dispensing Unit," filed Oct. 22, 2015, the contents of which are hereby incorporated by reference.

BACKGROUND

The present invention relates to a method of operating a hydrogen dispensing unit. The present invention more particularly relates to a method of operating a hydrogen dispensing unit where the hydrogen is cooled prior to dispensing the hydrogen to a hydrogen storage tank in a vehicle.

Hydrogen dispensing units are used to dispense high pressure hydrogen into hydrogen storage tanks in vehicles such as cars, buses, trucks, and forklifts.

There is growing interest to use hydrogen as a transportation fuel in cars, buses, trucks, and other vehicles. Hydrogen is generally stored in a fuel tank on-board the vehicles at high pressure. After most of the on-board hydrogen has been depleted, the pressure of the hydrogen in the fuel tank is reduced and the fuel tank must be refueled with hydrogen.

During refueling, hydrogen is dispensed into the fuel tank at a hydrogen dispensing station. The dispensing station includes a hydrogen supply, which can be one or more high pressure storage tanks. Hydrogen is transferred from the high pressure storage tank into the fuel tank of the vehicle. The driving force for transferring hydrogen is the pressure difference between the high pressure storage tank and the vehicle fuel tank.

Dispensing from a high pressure supply vessel to the lower pressure receiving vessel in a vehicle results in a temperature increase of the hydrogen that was dispensed. To compensate for the temperature rise of the dispensed hydrogen, hydrogen dispensing stations may include one or more heat exchangers to cool the hydrogen as it is being dispensed. Cooling may be provided by a refrigerant in a refrigeration cycle. The heat exchanger may comprise one or more high thermal capacity cooling blocks, which are cooled by the refrigerant and through which the hydrogen passes and is cooled.

The transfer line between the high pressure storage tank and the fuel tank typically includes various control valves, and block and bleed valves. A block valve blocks the flow from the high pressure storage tank and a bleed valve allows a portion of the hydrogen trapped between the block valve and the dispensing nozzle to discharge, thereby reducing the pressure at the dispensing nozzle. Accepted standards, such as SAE J2600 and ISO 17268, require that the pressure at the nozzle be less than 0.5 MPa (gauge) before the dispensing nozzle can be disconnected from the fueling receptacle on the vehicle.

While the transfer line between the block valve and the dispensing nozzle will be at a lower pressure after dispensing hydrogen to a vehicle, the residual hydrogen trapped in the transfer lines between the control valve and one or more block valves will still be at high pressure and a cold temperature because of being cooled in the heat exchanger.

As the hydrogen dispension unit sits idle waiting to refuel another vehicle, the temperature of the residual trapped hydrogen will increase resulting in a pressure increase in the lines. The resulting pressure increase may be greater than design pressure limits for the equipment. The resulting high pressure may cause the dispensing unit to trip because of protections configured to protect the vehicle from excessive pressure, or because the excessive pressure might be interpreted by the controller as some sort of pressure transducer failure. Pressure relief valves could be used to relieve the pressure when it exceeds safe limits, but pressure relief valves are known for failing to completely reseal after relieving the pressure. Use of pressure relief valves on a frequent basis is undesirable.

Industry desires reliable hydrogen dispensing units.

BRIEF SUMMARY

The present invention relates to a method for operating a hydrogen dispensing unit.

There are several aspects of the invention as outlined below. In the following, specific aspects of the invention are outlined. The reference numbers and expressions set in parentheses are referring to an example embodiment explained further below with reference to FIG. 1. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A method of operating a hydrogen dispensing unit (1) comprising:

dispensing hydrogen from a supply vessel (102) to a receiving vessel (118 or 218) via the hydrogen dispensing unit (1), the hydrogen dispensing unit (1) comprising a heat exchanger (106) to cool the hydrogen prior to the hydrogen being dispensed into the receiving vessel (118 or 218), said dispensing continuing until a target quantity of hydrogen is dispensed and thereupon terminating said dispensing;

wherein upon terminating said dispensing, a first quantity of hydrogen is trapped within a first one or more conduits (130, 132, 232, 233), the first one or more conduits operatively connecting a plurality of valves, the plurality of valves including a control valve (104) and a block valve (108 or 208), said first quantity of hydrogen being trapped upon closing said plurality of valves, at least a portion of the first quantity of hydrogen having been cooled in said heat exchanger (106), the first quantity of hydrogen exerting a pressure in the first one or more conduits (130, 132, 232, 233);

measuring the pressure of the first quantity of hydrogen in the first one or more conduits (130, 132);

opening and subsequently closing the block valve (108 or 208) when the pressure of the first quantity of hydrogen equals or exceeds a selected pressure thereby removing a fraction of the first quantity of hydrogen from the first one or more conduits (130, 132, 232, 233) and transferring the fraction of the first quantity to a second one or more conduits (134, 136 or 234, 236), the second one or more conduits (134, 136 or 234, 236) operatively connected to the block valve (108 or 208) and a bleed valve (114 or 214); and opening and subsequently closing the bleed valve (114 or 214) thereby discharging a first quantity of vented hydrogen from the second one or more conduits (134, 136 or 234, 236).

Aspect 2. The method of aspect 1 wherein the first quantity of vented hydrogen comprises at least a portion of the fraction of the first quantity of hydrogen.

Aspect 3. The method of aspect 1 or aspect 2 wherein during the steps of opening and subsequently closing the block valve (108 or 208) and opening and subsequently closing the bleed valve (114 or 214), the block valve (108 or 208) is opened at the same time as the bleed valve (114 or 214) is opened and the block valve (108 or 208) closed at the same time as the bleed valve (114 or 214) is closed.

Aspect 4. The method of aspect 1 or aspect 2 wherein during the steps of opening and subsequently closing the block valve (108) and opening and subsequently closing the bleed valve (114), the bleed valve (114) is opened and subsequently closed after the block valve (108) is opened and subsequently closed.

Aspect 5. The method of any one of the preceding aspects wherein at least a portion of the first quantity of hydrogen has an initial temperature less than $-17.5°$ C. or less than $-33°$ C. upon first being trapped.

Aspect 6. The method of any one of the preceding aspects wherein the control valve (104) is a pressure control valve, programmable pressure regulator, or a dome loaded regulator.

Aspect 7. The method of any one of the preceding aspects wherein upon terminating said step of dispensing, a second quantity of hydrogen is trapped within the second one or more conduits (234, 236), the second one or more conduits (234, 236) operatively connecting the block valve (208), the bleed valve (214), and a second block valve (226);

wherein the first quantity of vented hydrogen comprises a fraction or all of the second quantity of hydrogen.

Aspect 8. The method of any one of aspects 1 to 6 wherein upon terminating said step of dispensing, a second quantity of hydrogen is trapped within the second one or more conduits (234, 236), the second one or more conduits (234, 236) operatively connecting the block valve (208), the bleed valve (214), and a second block valve (226), the second quantity of hydrogen exerting a pressure in the second one or more conduits (234, 236), the method further comprising:

measuring the pressure of the second quantity of hydrogen in the second one or more conduits (234, 236); and opening and subsequently closing the bleed valve (214) when the pressure of the second quantity of hydrogen equals or exceeds a selected pressure thereby discharging a fraction or all of the second quantity of hydrogen from the second one or more conduits (234, 236).

Aspect 9. The method of aspect 7 or aspect 8 wherein upon terminating said step of dispensing, a third quantity of hydrogen is trapped within a third one or more conduits (235), the third one or more conduits (235) operatively connecting the second block valve (226) and a dispensing nozzle (210) having an internal valve, the third quantity of hydrogen exerting a pressure in the third one or more conduits (235), the method further comprising:

measuring the pressure of the third quantity of hydrogen in the third one or more conduits (235); and opening and subsequently closing the second block valve (226) when the pressure of the third quantity of hydrogen equals or exceeds a selected pressure thereby removing a fraction of the third quantity of hydrogen from the third one or more conduits (235) and transferring the fraction of the third quantity to the second one or more conduits (234, 236); and opening and subsequently closing the bleed valve (214) thereby discharging at least a portion of the fraction of the third quantity of hydrogen from the second one or more conduits (234, 236).

Aspect 10. The method of aspect 7 or aspect 8 wherein upon terminating said step of dispensing, a third quantity of hydrogen is trapped within a third one or more conduits (235), the third one or more conduits (235) operatively connecting the second block valve (226) and a dispensing nozzle (210) having an internal valve, the method further comprising:

opening and subsequently closing the second block valve (226) thereby removing a fraction of the third quantity of hydrogen from the third one or more conduits (235) and transferring the fraction of the third quantity to the second one or more conduits (234, 236), wherein during the steps of opening and subsequently closing the second block valve (226) and opening and subsequently closing the block valve (208), the second block valve (226) is opened at the same time as the block valve (208) is opened and the second block valve (226) is closed at the same time as the block valve (208) is closed.

Aspect 11. The method of aspect 10 wherein during the steps of opening and subsequently closing the block valve (208) and opening and subsequently closing the bleed valve (214), the block valve (208) is opened at the same time as the bleed valve (214) is opened and the block valve (208) closed at the same time as the bleed valve (214) is closed.

Aspect 12. The method of any one of the preceding aspects wherein the receiving vessel is a first receiving vessel of a series of receiving vessels, the method comprising:

connecting and disconnecting the hydrogen dispensing unit (1) to and from the first receiving vessel (118 or 218) of the series of receiving vessels (118 or 218); and discharging the first quantity of vented hydrogen through the bleed valve (114 or 214) after having dispensed hydrogen to the first receiving vessel (118 or 218) of the series of receiving vessels (118 or 218) and before dispensing hydrogen to a subsequent second receiving vessel of the series of receiving vessels (118 or 218).

Aspect 13. The method of any one of the preceding aspects wherein the first quantity of hydrogen is trapped within the first one or more conduits (130, 132, 232, 233) between the control valve (104) and the block valve (108 or 208).

Aspect 14. The method of any one of the preceding aspects wherein the control valve (104) is disposed upstream of the heat exchanger (106).

Aspect 15. The method of any one of the preceding aspects wherein the block valve (108 or 208) is disposed downstream of the heat exchanger (106).

Aspect 16. The method of any one of the preceding aspects comprising limiting the pressure of the hydrogen with a pressure regulator (206) disposed in the first one or more conduits (232, 233) between the control valve (104) and the block valve (208).

Aspect 17. A method for determining leakage in a control valve (104) of a hydrogen dispensing unit (1), the method comprising:

dispensing hydrogen from a supply vessel (102) to a receiving vessel (118 or 218) via the hydrogen dispensing unit (1), the hydrogen dispensing unit (1) comprising a heat exchanger (106) to cool the hydrogen prior to the hydrogen being dispensed into the receiving vessel (118 or 218), said dispensing continuing until a target quantity of hydrogen is dispensed and thereupon terminating said dispensing;

wherein upon terminating said dispensing, a first quantity of hydrogen is trapped within a first one or more conduits (130, 132, 232, 233), the first one or more conduits operatively connecting a plurality of valves, the plurality of valves including a control valve (104) and a block valve (108 or 208), said first quantity of hydrogen being trapped upon closing said plurality of valves, at least a portion of the first quantity of hydrogen having been cooled in said heat exchanger (106), the first quantity of hydrogen exerting a pressure in the first one or more conduits (130, 132, 232, 233);

measuring the pressure of the first quantity of hydrogen in the first one or more conduits (130, 132) thereby determining a measured pressure increase;

comparing the measured pressure increase with an expected pressure increase (due to the temperature rise); and determining whether the control valve (104) is leaking responsive to comparing the measured pressure increase with the expected pressure increase.

Aspect 18. The method of the preceding aspect wherein the receiving vessel is a first receiving vessel of a series of receiving vessels, the method comprising:

connecting and disconnecting the hydrogen dispensing unit (1) to and from the first receiving vessel (118 or 218) of the series of receiving vessels (118 or 218); and determining whether the control valve (104) is leaking responsive to comparing the measured pressure increase with the expected pressure increase after having dispensed hydrogen to the first receiving vessel of the series of receiving vessels (118 or 218) and before dispensing hydrogen to a subsequent second receiving vessel of the series of receiving vessels (118 or 218).

Aspect 19. The method of any one of the preceding aspects wherein the receiving vessel (118 or 218) is a fuel tank of a land vehicle such as a car, bus, truck, motorcycle, forklift, agricultural vehicle, construction machine, and a locomotive, or of an aircraft.

BRIEF DESCRIPTION OF SEVERAL VIEWS OF THE DRAWINGS

The FIGURE shows a process flow diagram for a hydrogen dispensing unit.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The term "plurality" means "two or more than two."

The phrase "at least a portion" means "a portion or all."

As used herein, "first," "second," "third," etc. are used to distinguish from among a plurality of steps and/or features, and is not indicative of the total number, or relative position in time and/or space unless expressly stated as such.

As used herein, "in fluid flow communication" means operatively connected by one or more conduits, manifolds, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

For the purposes of simplicity and clarity, detailed descriptions of well-known devices, circuits, and methods are omitted so as not to obscure the description of the present invention with unnecessary detail.

As used herein, pressures are gauge pressures unless explicitly stated otherwise.

The sole FIGURE is a process flow diagram for describing the method. The process flow diagram includes the dispensing unit 1 and receiving tanks 118 and 218 for two respective vehicles. The FIGURE shows two dispensing legs, one having a configuration suitable for dispensing hydrogen to moderate pressure (e.g. 35 MPa) and another having a configuration suitable for dispensing hydrogen to high pressure (e.g. 70 MPa). The configuration for dispensing to moderate pressure is shown for dispensing to receiving tank 218 and the configuration for dispensing to high pressure is shown for dispensing to receiving tank 118. The present invention is suitable for a hydrogen dispensing unit having one, two, or more dispensing legs.

The hydrogen dispensing unit comprises one or more hydrogen storage tanks 102. The one or more hydrogen storage tanks can be any hydrogen storage tanks known in the art. The one or more hydrogen storage tanks may include a plurality of storage tanks suitable for cascade filling.

The hydrogen dispensing unit comprises a control valve 104 operatively connected to the one or more storage tanks 102 via a transfer conduit 103. Control valve 104 may be a pressure control valve, programmable pressure regulator, or a dome loaded regulator. Control valve 104 controls the rate of transferring hydrogen from the one or more storage tanks 102 to the receiving tank 118 or receiving tank 218 depending on which dispensing leg is being used. The control valve 104 may control the rate of transferring hydrogen as a pressure ramp rate (i.e. change in pressure per unit time). The control valve 104 is operatively connected to the controller 120 and receives control signals from controller 120.

The hydrogen dispensing unit comprises a heat exchanger 106 operatively connected to the control valve 104 via a transfer conduit 130. Heat exchanger 106 cools the hydrogen as it is being dispensed from the one or more storage tanks 102 to the receiving tank 118 or receiving tank 218. The heat exchanger 106 may include a thermal ballast (thermal capacitor) such as an aluminum block as known from US 2008/0185068. Multiple cooling blocks, as known from US 2014/0007975 may be used. A pressure relief valve 105 may be connected to conduit 130 to relieve the pressure in conduit 130 should the pressure exceed a maximum allowable pressure. The pressure leaving the heat exchanger 106 may be measured using a pressure sensor 107. Pressure sensor 107 may be used during the controlled dispensing of the hydrogen, and to detect if the pressure in conduit 132 exceeds a desired maximum pressure.

For the high pressure (e.g. 70 MPa) dispensing leg, the hydrogen dispensing unit comprises a block valve 108 and a bleed valve 114 operatively connected to the control valve 104 via transfer conduits 132, 134, and 136. Block valve 108 may be constructed such that if it fails, it fails in the closed position. Bleed valve 114 may be constructed such that if it fails, it fails in the open position. The high pressure dispensing leg comprises a dispensing nozzle 110 operatively connected to the block valve 108. The dispensing nozzle 110 can be any dispensing nozzle known in the art for hydrogen fuelling, particularly one suited for dispensing hydrogen to 70 MPa.

The block valve 108 in combination with the bleed valve 114 are used to reduce the pressure in the dispensing nozzle 110 prior to disconnecting the dispensing nozzle 110 from the receptacle 112 of the vehicle as is known in the art of hydrogen fueling. It may be desired to maintain the pressure in transfer conduits 134 and 136 at about 0.3 MPa during idle periods. A pressure sensor 116 may be used to measure the pressure in the transfer conduits 134 and 136.

For the moderate pressure (e.g. 35 MPa) dispensing leg, the hydrogen dispensing unit may comprise a pressure regulator 206, a block valve 208, a bleed valve 214, and a second block valve 226 operatively connected to the control valve 104 via transfer conduits 232, 233, 234, and 236. The pressure regulator 206 may limit the pressure to the moderate pressure dispensing leg to about 42 MPa. The moderate pressure dispensing leg comprises a dispensing nozzle 210 operatively connected to the block valve 226. The dispensing nozzle 210 can be any dispensing nozzle known in the art for hydrogen fueling, particularly one suited for dispensing hydrogen to 35 MPa.

For the moderate pressure (35 MPa) dispensing leg, the dispensing nozzle 210 may comprise an internal block and bleed valve manifold. The pressure at the nozzle may be relieved to a desired pressure before disconnecting from receptacle 212 and the pressure in the conduits 234, 235, 236 may be maintained at a pressure ranging from 35 MPa to 42 MPa during idle periods.

Pressure sensors 238 and 216 may be used to measure the pressure in the respective transfer conduits. A pressure relief valve 228 and associated pressure sensor/transmitter 216 may be connected to conduit 235. The pressure relief valve 228 may be set to relieve gas at any desired pressure for example a pressure ranging from 46 MPa to 50 MPa.

A block valve is any valve that is capable of blocking the flow in both directions. Any suitable block valve known in the art of hydrogen fueling may be used.

A bleed valve is any device that is capable of bleeding off a gas from the conduit to vent the conduit. Any suitable bleed valve known in the art of hydrogen fueling may be used.

The hydrogen dispensing unit comprises a controller 120 operatively connected to the control valve 104, the various block valves, bleed valves, and pressure sensors. The controller may be a computer, process logic controller (PLC), or the like. Controllers are ubiquitous in the art of hydrogen dispensing. The controller 120 may receive signals from the pressure sensors 107, 116, 238 and 216 and send control signals to the block valves 108, 208, and 226 and bleed valves 114 and 214.

Hydrogen-fueled vehicles comprise a receiving tank 118 or 218, and a respective receptacle 112 or 212. Receiving tank 118 and receptacle 112 may be for receiving high pressure hydrogen gas (e.g. up to 70 MPa) and receiving tank 218 and receptacle 212 may be for receiving moderate pressure hydrogen gas (e.g. up to 35 MPa). Receiving tanks may have internal pressure sensors for measuring the pressure of the hydrogen contained within the respective receiving tank. The pressure sensor may communicate wirelessly with controller 120.

Prior to dispensing hydrogen, the dispensing nozzle is connected to the receptacle of the vehicle, for example dispensing nozzle 110 to receptacle 112 or dispensing nozzle 210 to receptacle 212.

The method is first described for the high pressure (70 MPa) dispensing leg and is applicable for any dispensing leg having a similar configuration.

The method comprises dispensing hydrogen from the one or more supply vessels 102 to receiving vessel 118 via the hydrogen dispensing unit 1. The flow rate of hydrogen is controlled using control valve 104. The hydrogen is passed through heat exchanger 106 to cool the hydrogen prior to the hydrogen being dispensed into the receiving vessel 118. Dispensing continues until a target quantity of hydrogen is dispensed, and after the target quantity is transferred, dispensing is terminated. The target quantity may be set by the target pressure for the receiving vessel 118 such that dispensing is terminated upon reaching a target pressure.

After the receiving tank 118 receives the target quantity, for example by reaching the target pressure, the flow is stopped by closing block valve 108. Then the pressure in the transfer line between block valve 108 and the dispensing nozzle 110 is reduced, for example to about 0.3 MPa by bleeding off at least a portion of the residual gas in the transfer line via bleed valve 114. When the pressure at the dispensing nozzle is sufficiently reduced, the dispensing nozzle is disconnected from the receptacle 112.

Upon terminating dispensing, a first quantity of cold hydrogen is trapped within conduits 130 and 132 between the control valve 104 and the block valve 108. In order to prevent $H_2$-containing gas losses, this residual $H_2$-containing gas is not vented. The first quantity of hydrogen is trapped upon closing valves 104 and 108 and was cooled in heat exchanger 106 and therefore has a temperature of, for example, less than about −17.5° C. or less than about −33° C. The first quantity of exerts a pressure in conduits 130 and 132.

As the hydrogen dispensing unit sits idle waiting to fill another vehicle fuel tank, the temperature of the first quantity hydrogen in conduits 130 and 132 will increase. As the temperature rises, so too does the pressure. At the end of dispensing, the pressure in the transfer lines of the dispensing unit could be about 76 to 80 MPa. If the dispensing terminates with hydrogen at 80 MPa in the transfer lines and the temperature of the hydrogen rises from −33° C. to +25° C., the pressure increases to about 100 MPa, which is far above the maximum allowable pressure that can be transferred to a vehicle with a maximum pressure rating of 87.5 MPa.

The method comprises measuring the pressure of the first quantity of hydrogen in conduits 130 and 132, for example with pressure sensor 107, as the temperature and pressure of the first quantity of hydrogen increases. The pressure sensor 107 is in signal communication with controller 120 and transmits a signal representative of the pressure to controller 120.

When the pressure of the first quantity of hydrogen equals or exceeds a selected pressure, for example a pressure ranging from 70 MPa to 87.5 MPa, the controller provides signal instructions to block valve 108 to open and subsequently close block valve 108 while control valve 104 is kept closed thereby removing a fraction of the first quantity of hydrogen from conduits 130 and 132 and transferring the fraction of the first quantity to conduits 134 and 136. As a result, the pressure of the gas in conduits 130 and 132 is decreased.

Conduits 134 and 136 are operatively connected to bleed valve 114. The method comprises opening and subsequently closing the bleed valve 114 thereby discharging at least a portion of the fraction of the first quantity of hydrogen from conduits 134 and 136.

Block valve 108 and bleed valve 114 may be opened simultaneously and closed simultaneously. Alternatively, block valve 108 may be opened and subsequently closed, followed by bleed valve 114 being opened and subsequently closed.

The method is now described for the moderate pressure (35 MPa) dispensing leg and is applicable for any dispensing leg having a similar configuration.

The method comprises dispensing hydrogen from the supply vessel 102 to receiving vessel 218 via the hydrogen dispensing unit 1. The hydrogen is passed through heat exchanger 106 to cool the hydrogen prior to the hydrogen being dispensed into the receiving vessel 218. Dispensing continues until a target quantity of hydrogen is dispensed, and after the target quantity is transferred, dispensing is terminated. The target quantity may be set by the target pressure for the receiving vessel 218 such that dispensing is terminated upon reaching the target pressure.

Upon terminating dispensing, a first quantity of cold hydrogen is trapped within conduits 130, 232 and 233, a second quantity of hydrogen is trapped within conduits 234 and 236, and a third quantity of hydrogen is trapped within conduit 235. The first quantity of hydrogen is trapped upon closing valves 104 and 208 and was cooled in heat exchanger 106 and therefore has a temperature of, for example, less than about −17.5° C. or less than about −33° C. The first quantity of exerts a pressure in conduits 130, 232, and 233. The second quantity of hydrogen is trapped upon closing valves 208 and 226 and was also cooled in heat exchanger 106 and therefore has a temperature of, for example, less than about −17.5° C. or less than about −33° C. The second quantity of exerts a pressure in conduits 234, and 236. The third quantity of hydrogen is trapped upon closing block valve 226 and the dispensing nozzle 210. Dispensing nozzle 210 has an internal valve. The third quantity of hydrogen was also cooled in heat exchanger 106 and therefore has a temperature of, for example, less than about −17.5° C. or less than about −33° C. The third quantity of hydrogen exerts a pressure in conduit 235.

As the hydrogen dispensing unit sits idle waiting to fill another vehicle fuel tank, the temperature of the first quantity hydrogen in conduits 130, 232, and 233 will increase, the temperature of the second quantity of hydrogen in conduits 234 and 236 will increase, and the temperature of the third quantity of hydrogen in conduit 235 will increase. As the temperature of the hydrogen rises, so too does the pressure of the hydrogen.

The method comprises measuring the pressure of the first quantity of hydrogen in conduits 130, 232, and 233, for example with pressure sensor 107, as the temperature and pressure of the first quantity of hydrogen increases. The pressure sensor 107 is in signal communication with controller 120 and transmits a signal representative of the pressure to controller 120.

When the pressure of the first quantity of hydrogen equals or exceeds a first selected pressure, for example a pressure ranging from 70 MPa to 87.5 MPa, the controller provides signal instructions to block valve 208 to open and subsequently close block valve 208 while control valve 104 is kept closed thereby removing a fraction of the first quantity of hydrogen from conduits 130, 232, and 233 and transferring the fraction of the first quantity to conduits 234 and 236. As a result, the pressure of the gas in conduits 130, 232, and 233 is decreased.

In the example embodiment control valve 104 is closed upon terminating dispensing and kept closed during discharging trapped hydrogen. In alternative embodiments an additional blocking means such as a block valve may be disposed between supply vessel 102 and control valve 104 or between control valve 104 and heat exchanger 106. In those embodiments the additional blocking means may be closed upon terminating dispensing and kept closed during discharging trapped hydrogen while control valve 104 is kept open, for example, in a minimum flow position.

Conduits 234 and 236 are operatively connected to a bleed valve 214. The method comprises opening and subsequently closing the bleed valve 214 thereby discharging at least a portion of the fraction of the first quantity of hydrogen and a fraction or all of the second quantity of hydrogen from conduits 234 and 236.

Bleed valve 214 may be opened before block valve 208 is opened or simultaneously with block valve 208 or after block valve 208 has been opened to remove a quantity of vented hydrogen from conduits 130 and 132. The quantity of vented hydrogen may comprise at least a portion of the fraction of the first quantity of hydrogen in case the bleed valve 214 and block valve 208 are opened simultaneously or bleed valve 214 is opened after block valve 208. In case bleed valve 214 is opened before block valve 208, a portion of the hydrogen trapped in conduits 234 and 236 may be vented as the quantity of vented hydrogen thereby providing capacity for a fraction of the first quantity of hydrogen to be transferred to the second one or more conduits 234 and 236.

After removal of the quantity of vented hydrogen, bleed valve 114 may be closed simultaneously with block valve 108 or after block valve 108 has been closed. For example, block valve 208 and bleed valve 214 may be opened simultaneously and closed simultaneously, or aternatively, block valve 208 may be opened and subsequently closed, followed by bleed valve 214 being opened and subsequently closed. In case block valve 208 and bleed valve 214 are operated sequentially, the pressure in conduits 234 and 236 may be lower than in 232 and 233 for the transfer of the fraction of the first quantity of hydrogen due to an earlier discharge of hydrogen from bleed valve 214.

The method may further comprise measuring the pressure of the second quantity of hydrogen in conduits 234 and 236, for example using pressure sensor 238 as the temperature of the second quantity of hydrogen increases. When the pressure of the second quantity of hydrogen equals or exceeds a second selected pressure, for example a pressure ranging from 35 to 44, the controller provides signal instructions to bleed valve 214 to open and subsequently close thereby discharging a fraction or all of the second quantity of hydrogen from conduits 234 and 236. As a result, the pressure of the hydrogen in conduits 234 and 236 is decreased. The second selected pressure may be the same or different from the first selected pressure and, if different, may be lower than the first selected pressure.

The method may comprise opening and subsequently closing block valve 226 thereby removing a fraction of the third quantity of hydrogen from conduit 235 and transferring a fraction of the third quantity of hydrogen to conduits 234 and 236. Block valve 208 and block valve 226 may be opened simultaneously and closed simultaneously. Further, bleed valve 214 may be opened simultaneously with the opening of block valve 208 and block valve 226, and bleed valve 215 may be closed simultaneously with the closing of block valve 208 and block valve 226 to vent the trapped hydrogen.

The method may further comprise measuring the pressure of the third quantity of hydrogen in conduit 235, for example using pressure sensor 216 as the temperature of the third quantity of hydrogen increases. When the pressure of the third quantity of hydrogen equals or exceeds a third selected pressure, for example a pressure ranging from 35 to 44, the controller provides signal instructions to block valve 226 to open and subsequently close thereby removing a fraction of the third quantity of hydrogen from conduit 235 and transferring the fraction of the third quantity of hydrogen to conduits 234 and 236. As a result, the pressure of the hydrogen in conduit 235 is decreased. The third selected pressure may be the same or different than the first selected pressure and/or the second selected pressure.

The method may then further comprise opening a closing the bleed valve 214 thereby discharging at least a portion of the fraction of the third quantity of hydrogen from conduits 234 and 236.

In another embodiment, the invention relates to a method for determining leakage in a control valve 104 of the hydrogen dispensing unit.

The leak detection method comprises dispensing hydrogen from the one or more supply vessels 102 to receiving vessel 118 via the hydrogen dispensing unit 1. The flow rate of hydrogen is controlled using control valve 104. The hydrogen is passed through heat exchanger 106 to cool the hydrogen prior to the hydrogen being dispensed into the receiving vessel 118. Dispensing continues until a target quantity of hydrogen is dispensed, and after the target quantity is transferred, dispensing is terminated. The target quantity may be set by the target pressure for the receiving vessel 118 such that dispensing is terminated upon reaching a target pressure.

After the receiving tank 118 reaches a target pressure, the flow is stopped by closing block valve 108. Then the pressure in the transfer line between block valve 108 and the dispensing nozzle 110 is reduced, for example to about 0.3 MPa by bleeding off at least a portion of the residual gas in the transfer line via bleed valve 114. When the pressure at the dispensing nozzle is sufficiently reduced, the dispensing nozzle is disconnected from the receptacle 112.

Upon terminating dispensing, a first quantity of cold hydrogen is trapped within conduits 130 and 132 between the control valve 104 and the block valve 108. In order to prevent $H_2$-containing gas losses, this residual $H_2$-containing gas is not vented. The first quantity of hydrogen is trapped upon closing valves 104 and 108 and was cooled in heat exchanger 106 and therefore has a temperature of, for example, less than −17.5° C. or less than −33° C. The first quantity of exerts a pressure in conduits 130 and 132.

As the hydrogen dispensing unit sits idle waiting to fill another vehicle fuel tank, the temperature of the first quantity hydrogen in conduits 130 and 132 will increase. As the temperature rises, so too does the pressure.

The leak detection method comprises measuring the pressure of the first quantity of hydrogen in conduits 130 and 132, for example with pressure sensor 107, as the temperature and pressure of the first quantity of hydrogen increases thereby determining a measured pressure increase. The pressure sensor 107 is in signal communication with controller 120 and transmits a signal representative of the pressure to controller 120.

The leak detection method comprises comparing the measured pressure increase with an expected pressure increase. From the initial pressure in the conduits 130 and 132 and the initial temperature, an expected pressure increase can be calculated for an expected temperature rise of the trapped hydrogen.

The leak detection method comprises determining whether the control valve (104) is leaking responsive to comparing the measured pressure increase with the expected pressure increase. The comparison may be done using controller 120.

We claim:

1. A method of operating a hydrogen dispensing unit comprising:
   dispensing hydrogen from a supply vessel to a receiving vessel via the hydrogen dispensing unit, the hydrogen dispensing unit comprising a heat exchanger to cool the hydrogen prior to the hydrogen being dispensed into the receiving vessel, said dispensing continuing until a target quantity of hydrogen is dispensed and thereupon terminating said dispensing;
   wherein upon terminating said dispensing, a first quantity of hydrogen is trapped within a first one or more conduits, the first one or more conduits operatively connecting a plurality of valves, the plurality of valves including a control valve and a block valve, said first quantity of hydrogen being trapped upon closing said plurality of valves, at least a portion of the first quantity of hydrogen having been cooled in said heat exchanger, the first quantity of hydrogen exerting a pressure in the first one or more conduits;
   measuring the pressure of the first quantity of hydrogen in the first one or more conduits;
   opening and subsequently closing the block valve when the pressure of the first quantity of hydrogen equals or exceeds a selected pressure thereby removing a fraction of the first quantity of hydrogen from the first one or more conduits and transferring the fraction of the first quantity to a second one or more conduits, the second one or more conduits operatively connected to the block valve and a bleed valve; and
   opening and subsequently closing the bleed valve thereby discharging a first quantity of vented hydrogen from the second one or more conduits.

2. The method of claim 1 wherein the first quantity of vented hydrogen comprises at least a portion of the fraction of the first quantity of hydrogen.

3. The method of claim 1 wherein during the steps of opening and subsequently closing the block valve and opening and subsequently closing the bleed valve, the block valve is opened at the same time as the bleed valve is opened and the block valve closed at the same time as the bleed valve is closed.

4. The method of claim 1 wherein during the steps of opening and subsequently closing the block valve and opening and subsequently closing the bleed valve, the bleed valve is opened and subsequently closed after the block valve is opened and subsequently closed.

5. The method of claim 1 wherein at least a portion of the first quantity of hydrogen has an initial temperature less than −17.5° C. or less than −33° C. upon first being trapped.

6. The method of claim 1 wherein the control valve is a pressure control valve, programmable pressure regulator, or a dome loaded regulator.

7. The method of claim 1 wherein upon terminating said step of dispensing, a second quantity of hydrogen is trapped within the second one or more conduits, the second one or more conduits operatively connecting the block valve, the bleed valve, and a second block valve;
wherein the first quantity of vented hydrogen comprises a fraction or all of the second quantity of hydrogen.

8. The method of claim 1 wherein upon terminating said step of dispensing, a second quantity of hydrogen is trapped within the second one or more conduits, the second one or more conduits operatively connecting the block valve, the bleed valve, and a second block valve, the second quantity of hydrogen exerting a pressure in the second one or more conduits, the method further comprising:
measuring the pressure of the second quantity of hydrogen in the second one or more conduits; and
opening and subsequently closing the bleed valve when the pressure of the second quantity of hydrogen equals or exceeds a second selected pressure thereby discharging a fraction or all of the second quantity of hydrogen from the second one or more conduits.

9. The method of claim 7 wherein upon terminating said step of dispensing, a third quantity of hydrogen is trapped within a third one or more conduits, the third one or more conduits operatively connecting the second block valve and a dispensing nozzle having an internal valve, the third quantity of hydrogen exerting a pressure in the third one or more conduits, the method further comprising:
measuring the pressure of the third quantity of hydrogen in the third one or more conduits; and
opening and subsequently closing the second block valve when the pressure of the third quantity of hydrogen equals or exceeds a third selected pressure thereby removing a fraction of the third quantity of hydrogen from the third one or more conduits and transferring the fraction of the third quantity to the second one or more conduits; and
opening and subsequently closing the bleed valve thereby discharging at least a portion of the fraction of the third quantity of hydrogen from the second one or more conduits.

10. The method of claim 7 wherein upon terminating said step of dispensing, a third quantity of hydrogen is trapped within a third one or more conduits, the third one or more conduits operatively connecting the second block valve and a dispensing nozzle having an internal valve, the method further comprising:
opening and subsequently closing the second block valve thereby removing a fraction of the third quantity of hydrogen from the third one or more conduits and transferring the fraction of the third quantity to the second one or more conduits;
wherein during the steps of opening and subsequently closing the second block valve and opening and subsequently closing the block valve, the second block valve is opened at the same time as the block valve is opened and the second block valve is closed at the same time as the block valve is closed.

11. The method of claim 1 wherein the receiving vessel is a first receiving vessel of a series of receiving vessels, the method comprising:
connecting and disconnecting the hydrogen dispensing unit to and from the first receiving vessel of the series of receiving vessels; and
discharging trapped hydrogen through the bleed valve, after having dispensed hydrogen to the first receiving vessel of the series of receiving vessels and before dispensing hydrogen to a subsequent second receiving vessel of the series of receiving vessels.

12. The method of claim 1 wherein the first quantity of hydrogen is trapped within the first one or more conduits between the control valve and the block valve.

13. The method of claim 1 wherein the receiving vessel is a fuel tank of a land vehicle such as a car, bus, truck, motorcycle, forklift, agricultural vehicle, construction machine, and a locomotive, or of an aircraft.

14. A method for determining leakage in a control valve of a hydrogen dispensing unit, the method comprising:
dispensing hydrogen from a supply vessel to a receiving vessel via the hydrogen dispensing unit, the hydrogen dispensing unit comprising a heat exchanger to cool the hydrogen prior to the hydrogen being dispensed into the receiving vessel, said dispensing continuing until a target quantity of hydrogen is dispensed and thereupon terminating said dispensing;
wherein upon terminating said dispensing, a first quantity of hydrogen is trapped within a first one or more conduits, the first one or more conduits operatively connecting a plurality of valves, the plurality of valves including a control valve and a block valve, said first quantity of hydrogen being trapped upon closing said plurality of valves, at least a portion of the first quantity of hydrogen having been cooled in said heat exchanger, the first quantity of hydrogen exerting a pressure in the first one or more conduits;
measuring the pressure of the first quantity of hydrogen in the first one or more conduits thereby determining a measured pressure increase;
comparing the measured pressure increase with an expected pressure increase; and
determining whether the control valve is leaking responsive to comparing the measured pressure increase with the expected pressure increase.

15. The method of claim 14 wherein the receiving vessel is a first receiving vessel of a series of receiving vessels, the method comprising:
connecting and disconnecting the hydrogen dispensing unit to and from the first receiving vessel of the series of receiving vessels; and
determining whether the control valve is leaking responsive to comparing the measured pressure increase with the expected pressure increase after having dispensed hydrogen to the first receiving vessel of the series of receiving vessels and before dispensing hydrogen to a subsequent second receiving vessel of the series of receiving vessels.

16. The method of claim 14 wherein the receiving vessel is a fuel tank of a land vehicle such as a car, bus, truck, motorcycle, forklift, agricultural vehicle, construction machine, and a locomotive, or of an aircraft.

* * * * *